June 28, 1966          R. L. DILLS          3,258,579

OVEN CONTROL CIRCUIT

Filed Dec. 26, 1963

INVENTOR.
RAYMOND L. DILLS
BY Richard L. Caslin
HIS ATTORNEY

United States Patent Office 3,258,579
Patented June 28, 1966

1

3,258,579
OVEN CONTROL CIRCUIT
Raymond L. Dills, Louisville, Ky., assignor to General Electric Company, a corporation of New York
Filed Dec. 26, 1963, Ser. No. 333,338
5 Claims. (Cl. 219—398)

The present invention relates to electric ranges and, more specifically, to control circuitry for electric range ovens.

Generally, electric range ovens are provided with an upper and a lower heating unit. A control circuit is utilized to allow selective control of the two units so as to provide optimum heat conditions within the oven for baking and broiling. The primary function of the upper heating unit is to provide radiant heat for broiling; however, improved baking results are obtained when the upper unit is energized during baking to supplement the heat output of the lower heating unit. During baking the heat output from the upper unit must be considerably less than that of the lower unit to provide optimum baking. Thus, it is desirable that an oven include an upper heating unit which provides a high heat output during broiling and a reduced heat output during baking.

Prior art ovens have been available wherein the upper heating unit is operated in the above-described manner. Generally, such operation has been achieved either by providing an upper heating unit including two discrete resistance elements which are selectively energized, or by the provision of a single resistance element arranged to be energized at different line voltages for baking and broiling. Such prior art systems have not proved completely satisfactory due to their relative complexity. Further, those few prior art systems which are not unduly complex, provide insufficient differences between the heating of the upper and lower heating units to achieve optimum baking conditions.

The present invention obviates the necessity of an upper heating unit having two discrete resistance elements or of energizing the heating element with different line voltages and provides an optimum heating difference between the upper and lower heating units during baking without undue complexity.

It is accordingly an object of the present invention to provide an improved oven heating control.

Another object is to provide an improved and simplified oven heating system employing only two resistance heating elements.

Yet another object is to provide an oven heating system employing two heating elements arranged to be energized so as to produce optimum heating for baking and broiling.

Still another object is to provide an improved oven heating control whereby the heat output of the upper heating unit during baking is sufficiently less than that of the lower heating unit to insure optimum baking conditions.

These and other objects are achieved in one embodiment of the invention by the provision of upper and lower heating units connected in a diode bridge circuit. A first leg of the diode bridge comprises first and second inversely-poled serially-connected diodes. The second leg of the bridge includes the upper heating unit serially-connected with third and fourth inversely-poled diodes, the polarity of the third and fourth diodes being the same as that of the second and first diodes respectively. A series circuit comprising an electrically controllable switching device and the lower heating unit is connected from the junction between the first and second diodes to a point intermediate the third and fourth diodes. In this manner, current flows through the lower heating unit

2 during both half-cycles of the line voltage whereas current only flows through the upper heating unit during one half-cycle. Thus, a five to one ratio is achieved between the power supplied to the lower heating unit with respect to the upper heating unit and optimum baking conditions are realized. The temperature within the oven is varied by controlling the phase angle of conduction of the electrically controllable switching device to thereby define the average value of the current flowing through the upper and lower heating units.

The novel and distinctive features of the invention are set forth in the appended claims. The invention itself, together with further objects and advantages thereof, may be best understood by reference to the following description and accompanying drawing in which:

Figure 1:
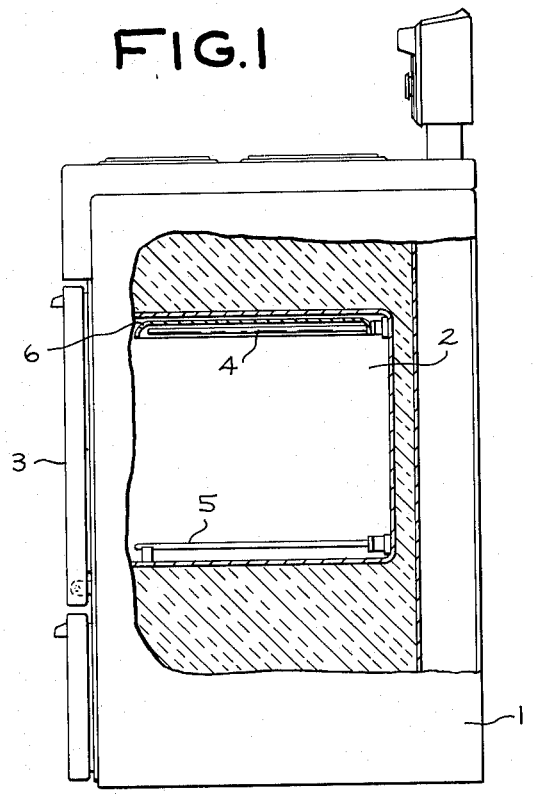
FIGURE 1 is a side elevational view, partly broken away, of an electric range having an oven provided with upper and lower heating units controlled in accordance with the present invention.

Referring to FIGURE 1, there is shown an electric range 1 having an oven 2, access to the oven being through the hinged door 3. The oven is provided with an upper heating unit 4 at the top thereof and a lower heating unit 5 at the bottom thereof. The upper heating unit 4 is provided with a suitable heat reflector 6.

During broiling the upper heating unit 4 is energized while the lower heating unit 5 is de-energized, by the manipulation of suitable switches not shown. During baking, the lower heating unit 5 is energized; however, it is also desirable in order to achieve optimum baking and browning that the upper heating unit 4 be energized at a power level reduced from that existing during broiling. It has been found that optimum baking results are achieved if the power supplied to the upper heating unit is one-fifth that supplied to the lower heating unit.

Figure 2:
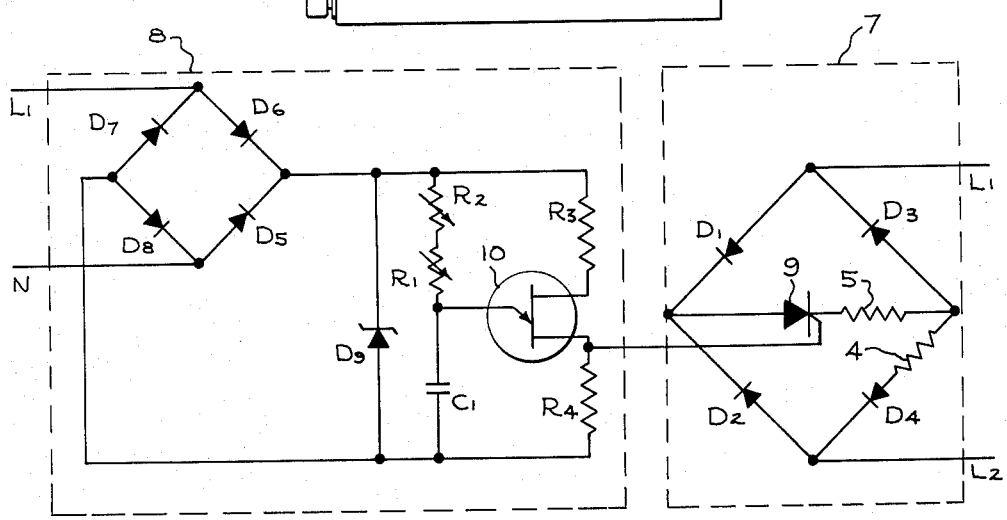
FIGURE 2 depicts, in schematic form, the improved oven control of the present invention.

Referring to FIGURE 2 there is shown in schematic form the improved oven control of the present invention. Generally, the oven control of FIGURE 2 comprises a diode bridge 7 including the upper and lower heating units 4 and 5 respectively and a current control circuit 8. The diode bridge circuit 7 is connected across the lines power supply $L_1$ and $L_2$ and includes a first leg having first and second serially-connected inversely-poled diodes $D_1$ and $D_2$. A second leg of the bridge includes inversely-poled diodes $D_3$ and $D_4$ serially-connected with the upper heating unit 4. The anode of a silicon controlled rectifier 9 is connected to the junction between the diodes $D_1$ and $D_2$ while the cathode of the silicon controlled rectifier 9 is connected through the lower heating unit 5 to a point intermediate the diodes $D_3$ and $D_4$.

It is seen that during one half-cycle of the line voltage when the line $L_1$ is positive and the silicon controlled rectifier 9 is conducting, current flow will be through the diode $D_1$, the silicon controlled rectifier 9, the lower heating unit 5, the upper heating unit 4 and the diode $D_4$. During the other half-cycle when the line $L_2$ is positive and the silicon controlled rectifier 9 is conducting the current flow is through the diode $D_2$, silicon controlled rectifier 9, lower heating unit 5 and diode $D_3$. Thus, it is seen that current flows through the lower heating unit 5 during both half-cycles when the silicon controlled rectifier 9 is conducting; however, current only flows through the upper heating unit 4 during the half-cycle when the line $L_1$ is positive. Assuming the resistances of the heating units 4 and 5 to be identical and neglecting the resistances of the diodes $D_1$–$D_4$ and silicon controlled rectifier 9, it is seen that lower heating unit 5 will be supplied with five times the power supplied to upper heating unit 4, thus, providing the desired condition during baking. Since the heating units 4 and 5 are in series when the line $L_1$ is positive, the heating of each unit in accordance with the familiar $I^2R$ equation will be identical for both units. However, when the line $L_2$ is positive only the heating unit 5 is connected across the line. Thus, since the resistance across the line is halved with respect to that existing during the opposite polarity half-cycle, the current through the heating unit 5 will double. In accordance with the $I^2R$ equation the heating of the heating unit 5 will be four times that during the opposite half-cycle. Thus, it is seen that the power supplied to and hence the heating of the lower heating unit 5 over the full cycle is truly five times that of the upper heating unit 4.

The phase angle of conduction of the silicon controlled rectifier 9 is controlled to vary the average current through the heating units 4 and 5 by connecting the gate of the silicon controlled rectifier 9 to the current control circuit 8. The current control circuit 8 comprises a unijunction transistor relaxation oscillator utilized to effect phase control. A full-wave diode bridge comprising diodes $D_5$–$D_8$ is connected across the lines $L_1$ and N to apply a positive polarity pulsating D.C. voltage across the unijunction transistor 10 and an R-C timing circuit comprising a temperature dependent resistance $R_1$ exhibiting a positive temperature coefficient of resistance, a temperature set potentiometer $R_2$ and a capacitor $C_1$. A Zener diode $D_9$ is connected across the diode bridge to clamp the voltage applied to the R-C timing circuit and the unijunction transistor at a prescribed level. The temperature dependent resistance $R_1$ is positioned in the oven to control the phase angle of conduction of the silicon controlled rectifier in accordance with the temperature within the oven so as to provide temperature stabilization. The emitter of the unijunction transistor 10 is connected to the junction between the resistance $R_1$ and capacitor $C_1$. A temperature stabilizing resistance $R_3$ is connected between the second base of the transistor and the pulsating D.C. voltage in accordance with known techniques. A load resistance $R_4$ is connected between the first base of the unijunction transistor 10 and line N, the high side of the load resistance $R_4$ being connected to the gate of the silicon controlled rectifier 9 to control the firing thereof.

The operation of the unijunction transistor relaxation oscillator is well-known and thus will only be described briefly herein. Assuming the unijunction transistor to be initially non-conductive the capacitor $C_1$ will charge through the temperature dependent resistance $R_1$ and temperature set potentiometer $R_2$ during each half-cycle of the line voltage. Because of the full-wave rectification effected by the diode bridge comprising diodes $D_5$–$D_8$ the capacitor $C_1$ will charge in such a manner as to cause the voltage at the emitter of the unijunction transistor 10 to become more positive during each half-cycle. When the capacitor is charged to a point where the peak point emitter voltage of unijunction transistor is reached, the transistor will fire thereby discharging the capacitor $C_1$ through the load resistance $R_4$ and applying a positive pulse to the gate of the silicon controlled rectifier 9. Thus, silicon controlled rectifier 9 is rendered conductive when the unijunction transistor 10 conducts. The silicon controlled rectifier 9 continues to conduct even though the positive polarity gating pulse is removed, conduction continuing until the anode is no longer positive with respect to the cathode. The temperature set potentiometer $R_2$ can be varied to control the time in which the capacitor $C_1$ is charged to the peak point emitter voltage of the unijunction transistor 10 to thus control the phase angle of conduction of the silicon controlled rectifier 9 and define the average current flowing through the heaters 4 and 5. As the oven heats to a temperature defined by the setting of the temperature set potentiometer $R_2$, the resistance of the temperature dependent resistance $R_1$ increases thereby increasing the time required to charge capacitor $C_1$ to the peak point emitter voltage and stabilizing the heating conditions within the oven.

Thus, it is seen when the line $L_1$ is positive with respect to line $L_2$ and hence with respect to line N, a positive half-cycle will appear across the unijunction transistor 10 and the R-C timing circuit comprised of resistance $R_1$, potentiometer $R_2$ and capacitance $C_1$. When the capacitor $C_1$ charges to the peak point emitter voltage, in a time defined by the setting of potentiometer $R_2$, and the temperature of resistance $R_1$, the unijunction transistor 10 will fire. Thus, a gating pulse is applied to the gate electrode of the silicon controlled rectifier 9 to render this element conductive. Accordingly, current will flow through the diode $D_1$, silicon controlled rectifier 9, lower heating unit 5, upper heating unit 4, and diode $D_4$.

Similarly, when the line $L_2$, and hence the line N, is positive with respect to the line $L_1$, a positive half-cycle is impressed across the R-C timing circuit and the unijunction transistor. Again, when the capacitor $C_1$ is charged to the peak point emitter voltage a positive gating pulse will be applied to the gate electrode of the silicon controlled rectifier 9, thus, rendering this element conductive. Accordingly, current flow will be through the diode $D_2$, silicon controlled rectifier 9, lower heating unit 5 and diode $D_3$. Thus, the desired reduced heating of the upper heating unit 4 with respect to the lower heating unit 5 is achieved and through the use of a phase control the average current flowing through the heating units 4 and 5 can be varied by controlling the phase angle of conduction of the silicon controlled rectifier in accordance with the setting of the potentiometer $R_2$ and the temperature of the temperature dependent resistance $R_1$.

Although the invention has been described with respect to certain specific embodiments, it will be appreciated that modifications and changes may be made by those skilled in the art without departing from the spirit of the invention.

What is claimed as new and desired to be secured by Letters Patent of the United States is:

1. In an electric range oven having an upper heater and a lower heater, a control system for proportioning the current flow through said upper and lower heaters, said control system comprising:
    (a) a bridge circuit having first and seconds legs connected in parallel and arranged for connection between first and second power supply lines of a source of alternating voltage,
    (b) said first leg including first and second serially-connected inversely-poled rectifying elements having their respective anodes connected to said first and second power supply lines respectively,
    (c) said second leg including third and fourth inversely-poled rectifying elements having their respective cathodes connected to said first and second power supply lines respectively and their anodes serially-connected through said upper heater,
    (d) circuit means connected between the junction of said first and second rectifying elements and a point intermediate the anode of said third rectifying element and said upper heater,
        (1) said circuit means including an electrically controlled unidirectional switching device serially-connected with said lower heater and adapted to allow current flow from said first leg to said second leg.

2. A control system as defined in claim 1 including means responsive to the temperature in said oven for controlling the phase angle of conduction of said controlled unidirectional switching device.

3. A control system as defined in claim 1 wherein said electrically controlled unidirectional switching device is a silicon controlled rectifier.

4. A control system as defined in claim 1 including means for controlling the phase angle of conduction of said controlled unidirectional switching device, said means comprising:

(a) a unijunction transistor having an emitter and first and second base electrodes, (b) R-C timing means including resistive means exhibiting a positive temperature coefficient of resistance, said resistive means being located in said oven, (c) said R-C timing means being connected to the emitter of said unijunction transistor, (d) said first base of said unijunction transistor being connected to the gate electrode of said silicon controlled rectifier.

5. In an electric range oven having an upper heater and a lower heater, a control system for proportioning the current flow through said upper and lower heaters, said control system comprising:

(a) a diode bridge including first and second legs connected in parallel and arranged for connection between first and second power supply lines of a source of alternating voltage, (b) said first leg including first and second serially-connected inversely-poled rectifying elements having their respective anodes connected to said first and second power supply lines respectively, (c) said second leg including third and fourth inversely-poled rectifying elements having their respective cathodes connected to said first and second power supply lines respectively and their anodes serially-connected through said upper heater, (d) circuit means connected between the junction of said first and second rectifying elements and a point intermediate the anode of said third rectifying element and said upper heater, (1) said circuit means including said lower heater serially-connected with a silicon controlled rectifier, (e) means connected to the gate electrode of said silicon controlled rectifier for controlling the phase angle of conduction of said silicon controlled rectifier in accordance with the temperature of said oven.

References Cited by the Examiner

UNITED STATES PATENTS

| | | | |
|---|---|---|---|
| 2,790,056 | 4/1957 | Fry | 219—398 |
| 3,149,224 | 9/1964 | Horne et al. | 219—501 |
| 3,161,759 | 12/1964 | Gambill | 219—497 |

RICHARD M. WOOD, *Primary Examiner.*

ANTHONY BARTIS, *Examiner.*

L. H. BENDER, *Assistant Examiner.*